116,213

UNITED STATES PATENT OFFICE.

WILLIAM F. NILES AND SETH G. PITTS, OF LEOMINSTER, MASS.

IMPROVEMENT IN THE MANUFACTURE OF ARTICLES FROM PULVERIZED HORN.

Specification forming part of Letters Patent No. 116,213, dated June 20, 1871.

*To all whom it may concern:*

Be it known that we, WILLIAM F. NILES and SETH G. PITTS, both of Leominster, in the county of Worcester and State of Massachusetts, have invented certain new and useful Improvements in the Process of Manufacturing Articles from Pulverized Horn or Hoof; and we do hereby declare the following to be a full, clear, and exact description of our said process sufficient to enable others skilled in the art to which our invention belongs to understand and use the same.

The accompanying drawing represents one useful article made from pulverized horn by our improved process, to wit, a martingale-ring.

Our improved process of manufacturing articles from pulverized horn or hoof is as follows:

We take the raw horn or hoof, and, after washing it to remove the dirt and dividing it into convenient-sized pieces, we grind it to a fine dust or powder upon an emery-wheel, grindstone, or other suitable pulverizing or grinding machine. The dust or powder thus obtained is mixed with a large quantity of water and passed through one or more depositing-tanks to free it from mineral dirt or grit, which latter, being heavier than the horn powder, quickly settles to the bottom of the tanks. After the dirt or grit has been separated from the dust a coloring-dye is added to the latter while it remains mixed with the water, which insures an equal distribution of the dye to all of the particles of the dust, so that a uniform color or tint is produced. Different colors or tints may be used, as best suits the conditions of the work or the taste of the manufacturer; or, if preferred, the coloring-dye may be omitted. The dust or powder is next separated from the water, which can be done by allowing it to remain quiet in the tanks until the dust settles to the bottom, and then drawing off the water, or by drawing the mixture into cloth bags and forcing out the water by means of suitably-applied pressure. The latter operation has been found to be the most expeditious and satisfactory. After removing the greater part of the water, as above stated, the dust is dried and passed through a fine sieve to reduce the lumps and to remove any coarse substance which may be present. We have found it desirable, in order to facilitate subsequent operations, to slightly moisten the dust previous to passing it through the sieve. The material is next placed in suitable forming-dies constructed to correspond to the required shape of the article to be formed, the quantity required to fill the die being determined by weight or otherwise. The forming-dies are closed by means of any suitable press, and are heated, when thus closed, to a high degree of temperature, whereby the particles of the material within the die are consolidated and cemented into a firm and solid mass of great tenacity and hardness. The dies may be cold or slightly heated previous to filling, and then reheated during the operation of forming the articles, the heat being applied either by steam or in any other convenient manner. The heat can be applied both to the press and dies, if desired, or simply to the dies alone. After removing the articles from the forming-dies they are placed in seasoning-ovens, which are formed nearly air-tight, and are there allowed to remain, subjected to a temperature of about 200° Fahrenheit, until all moisture is removed, which requires from two to seven days, according to the size of the articles and other circumstances. During the operation of seasoning the doors of the oven should be occasionally opened to allow the steam or moisture to escape from the interior of the oven.

It will, of course, be understood that the operation of seasoning can be performed by other methods than that described above; but we have found the above method to be quite satisfactory in its results. We have also ascertained that the articles are produced in greater perfection if the forming-dies are but moderately heated when the prepared dust is placed in them; consequently the dies require to be somewhat cooled after each operation before they are refilled.

The articles after seasoning are finally polished or finished by any of the well-known methods.

By the use of our invention a great variety of useful and ornamental articles can be produced, and, when desired, the articles may be inlaid with gold, silver, or other material, during the process of formation, by arranging the inlay design within the forming-dies previous to filling them with the dust or powder.

Having described our improvements in the manufacture of various articles, what we claim therein as new and of our invention, and desire to secure by Letters Patent, is—

1. The process, substantially as above described, of manufacturing articles from pulverized or ground horn or hoof.

2. A martingale-ring made from pulverized horn or hoof, substantially as described.

WILLIAM F. NILES.

Witnesses:
SETH G. PITTS.
THOS. H. DODGE,
A. E. PEIRCE.